(12) United States Patent
Watanabe et al.

(10) Patent No.: US 7,453,420 B2
(45) Date of Patent: Nov. 18, 2008

(54) DISPLAY DEVICE WITH ELECTROSTATIC DISCHARGE PROTECTION CIRCUITRY

(75) Inventors: Hidetoshi Watanabe, Kobe (JP); Toshiya Inada, Kobe (JP)

(73) Assignee: TPO Hong Kong Holding Limited (TW)

( * ) Notice: Subject to any disclaimer, the term of this patent is extended or adjusted under 35 U.S.C. 154(b) by 90 days.

(21) Appl. No.: 10/545,465

(22) PCT Filed: Feb. 6, 2004

(86) PCT No.: PCT/IB2004/000387

§ 371 (c)(1),
(2), (4) Date: Aug. 11, 2005

(87) PCT Pub. No.: WO2004/072941

PCT Pub. Date: Aug. 26, 2004

(65) Prior Publication Data

US 2006/0145951 A1 Jul. 6, 2006

(30) Foreign Application Priority Data

Feb. 14, 2003 (JP) ............................. 2003-037244

(51) Int. Cl.
*G09G 3/18* (2006.01)
(52) U.S. Cl. ............................. 345/55; 345/92; 345/93; 345/100; 345/212; 345/214
(58) Field of Classification Search ............. 345/50–55, 345/87–104, 204–215, 690–699; 257/59, 257/360

See application file for complete search history.

(56) References Cited

U.S. PATENT DOCUMENTS

| | | | | |
|---|---|---|---|---|
| 5,220,443 A | * | 6/1993 | Noguchi | 349/40 |
| 5,371,351 A | * | 12/1994 | Van Berkel | 250/208.1 |
| 5,657,139 A | * | 8/1997 | Hayashi | 349/40 |
| 5,744,837 A | * | 4/1998 | Kamiura et al. | 257/355 |
| 5,900,767 A | * | 5/1999 | Bird et al. | 327/407 |
| 5,973,658 A | | 10/1999 | Kim et al. | |
| 6,013,923 A | * | 1/2000 | Huang | 257/59 |
| 6,175,394 B1 | * | 1/2001 | Wu et al. | 349/40 |
| 6,696,701 B2 | * | 2/2004 | Hector et al. | 257/72 |
| 2001/0026251 A1 | * | 10/2001 | Hunter et al. | 345/55 |
| 2003/0030054 A1 | | 2/2003 | Hector et al. | |

* cited by examiner

*Primary Examiner*—Vijay Shankar
(74) *Attorney, Agent, or Firm*—Venable LLP; Raymond J. Ho

(57) ABSTRACT

An object of the invention is to provide electrostatic discharge damage protection during manufacturing and to suppress power consumption as low as possible during ordinary use of the electronic device having been manufactured, with avoidance of the problem of electric corrosion. An electronic device 10 comprising an array of pixels 12 wherein row and column address lines 18, 20 for addressing each pixel 12 are arranged. Each address line is connected to a discharge line 30, 32 through a discharge 38. The circuit allows the passage of charge between the address line and the first discharge line 30 when the address line is at a potential below that of the first discharge line, and allows the passage of charge between the address line and the second discharge line 32 when the address line is at a potential above that of the second discharge line. The discharge elements have a configuration in which the one is in an electrically floating state during ordinary operation of the electronic device, or a conductive path making conduction in order that leakage current of the discharge device occurring during ordinary operation of the electronic device can be used for the peripheral circuitry.

18 Claims, 9 Drawing Sheets

DISPLAY DEVICE WITH ELECTROSTATIC DISCHARGE PROTECTION CIRCUITRY

BACKGROUND OF THE INVENTION

1. Field of the Invention

This invention relates to electrostatic discharge protection for electronic devices comprising an array of pixels. The invention particularly relates to an electrostatic discharge protection circuit suitable to a display device that is used in an apparatus requiring a low power consumption and to a display device taking such protection measures.

2. Description of the Related Art

Electrostatic discharge (ESD) damage is a well known phenomenon which can occur during the fabrication of semiconductor devices, such as metal-oxide semiconductor (MOS) structures. In particular, ESD damage can result in gate insulating layer breakdown, large shifts in threshold voltages and large leakage currents between transistor electrodes.

ESD damage has been found to be a particular problem during the fabrication of devices using arrays of thin film transistors (TFTs), such as those serving as pixel switching elements in pixellated devices. Arrays of these transistors are used in, for example, active matrix liquid crystal displays and other active matrix display devices, and in sensing array devices such as radiation imaging detectors as well. During fabrication, significant quantities of charge may form on the source and drain electrodes of the TFTs. In particular, the row and column conductors used to address the individual pixels in the array provide long conductors on which static charge can be picked up and subsequently transferred to the TFT electrodes.

This static charge may result in breakdown of the gate insulating layer, and can result in a voltage differential between the gate and source electrodes or the gate and drain electrodes which can in turn cause the threshold voltage of the TFTs to shift.

The problem of ESD damage is not confined to TFT array devices but can be found also in array devices using alternative kinds of switching elements, for example two terminal devices such as thin film diodes or other non-linear devices.

The need to prevent ESD damage is widely recognised, and several different approaches have been developed. One example is the use of shorting bars surrounding the TFT array which link all of the source lines and gate lines of the individual TFTs together. The shorting lines are manufactured at the same time as the gate and source lines, so that the gate and source electrodes remain at the same potential throughout the fabrication process. This prevents any voltage differential from occurring across electrodes of the transistors, and therefore prevents ESD damage within the TFT devices.

However, the shorting lines must be removed from the device before the switching array can be used. This requires a cutting process, which introduces additional processing steps, and also means that the ESD protection is not available from that cutting process until of connecting peripheral circuitry to the TFT array.

It is also known to provide ESD damage protection circuits (surge protection circuits) which remain in place even during operation of the device from a Patent Document 1, for example.

(Patent Document 1)

Japanese Patent Application Laid-Open No. 119256/99 ($*^1$Paragraph Nos. [0019] to [0021] and FIG. 9, and $*^2$Paragraph Nos. [0029] to [0060] and FIG. 1)

These protection circuits typically allow charge to flow between a discharge element (reference potential line) and the row or column lines (scanning lines or signal lines) when a voltage differential is exceeded with respect to a certain reference. A problem with these protection circuits is that they may consume a considerable proportion of the total power budget of the device. For example, in low power active matrix LCD applications, more than 50% of the total display power budget may be consumed by the protection circuits. Therefore, whilst these protection circuits may provide protection during fabrication of the TFT array and also during connection of peripheral circuitry, unacceptably high levels of power consumption may result during operation of the manufactured device.

The Patent Document also discloses a way to suppress power consumption of the protection circuit itself during ordinary operation of the device by applying a predetermined voltage to the discharge elements ($*^2$). However, the effect of suppressing power consumption is still insufficient. Especially, such display devices, for example used in portable devices requiring long time operation by a limited capacity of a battery, whose low power consumption is regarded as very important in respect of quality of the products, need even more improvement of the effect of suppressing power consumption. These types of display devices may be considered to be seriously defective in the product quality even if some ones have surface impressions that they waste very little power consumption. Therefore, we would like to reduce wasteful power consumption as much as possible.

In addition, the technique mentioned in the above document requires provision of a power supply conductive line connecting a power supply or voltage supply source to the discharge element for applying a voltage to the discharge element. The conductive line is applied with a fixed voltage of a constant value and extends from the outer edge side of the array substrate to the discharge element at the display area side, whereby electronical corrosion is empirically supposed to be easy to occur.

SUMMARY OF THE INVENTION

The present invention has been made in view of the above-mentioned circumstances, and its primary object is to provide an electrostatic discharge protection circuit and electronic device comprising it, which provide electrostatic discharge damage protection during manufacturing a TFT array as well as during mounting the peripheral circuitry and can suppress power consumption as low as possible during ordinary use of the electronic device having been manufactured.

An object of the invention is also to provide an electrostatic discharge protection circuit and an electronic device comprising it, which can avoid a problem of electrical corrosion as mentioned above.

In order to achieve the above-mentioned objects, one aspect of the invention is an electronic device comprising: an array of pixels provided on a substrate and arranged in rows and columns, each pixel comprising a switching element; and a plurality of row and column address lines for addressing each pixel, wherein each row and column address line is connected to a first discharge element through a first discharge device and to a second discharge element through a second discharge device, wherein the first discharge device allows the passage of charge between the address line and the first discharge element when the address line is at a potential below that of the first discharge element, and the second discharge device allows the passage of charge between the address line and the second discharge element when the address line is at a potential above that of the second discharge element, wherein at least one of the first and second discharge elements has a configuration in which the one is in an electrically floating state during ordinary operation of the electronic device.

Each row and column is associated with two discharge elements, one of which is used to discharge electrostatic charges resulting in an increase in voltage on the row or column address line, and the other of which is used to discharge electrostatic charges resulting in a drop in the voltage on the row or column address line. By making electrically floating on at least one of the two discharge elements during operation of the manufactured device, it has been found that it is possible to prevent the discharge devices coupled with the discharge element from operating with much leakage current. In particular, it has been found that during operation of the device, power consumption can be more considerably reduced as compared with the case where voltages are provided on the discharge elements which result in all of the discharge devices being reverse-biased, for all normal operating voltages applied to the row and column address lines. Moreover, this constitution does not require any conductive line for applying a fixed voltage from a different supply conductive line to the discharge element, so that the problem of electrical corrosion of such a conductive line is very preferably not caused.

In this aspect, the first discharge element may comprise one or more conductive tracks to which the row and column address lines are connected through their respective first discharge devices, the conductive tracks being arranged in the vicinity of the periphery of the pixel array, or the second discharge element may comprise one or more conductive tracks to which the row and column address lines are connected through their respective second discharge devices, the conductive tracks being arranged in the vicinity of the periphery of the pixel array, and preferably all of the row and column address lines is coupled with the conductive track. Additionally, the conductive track may be extended surrounding the periphery of the pixel array. According to this, effective patterns of conductive track can be formed in a simple way.

Each discharge device may comprise at least one unidirectionally conductive element. The unidirectionally conductive element may typically be a diode-connected transistor. During fabrication of the electronic device, no external voltages are applied to the discharge elements, and any electrostatic charge resulting in a change in significant voltage sufficient to overcome the effective diode turn-on voltage will result in forward bias of the diode-connected transistor, so that charges can be dissipated to one or other of the discharge elements. However, during operation of the electronic device, since no significant voltages due to the electrostatic charges occur, the diode-connected transistors can be prevented from acting with much leakage current.

During fabrication of the electronic device, it is preferable for the two discharge elements to be coupled together. This may be provided by a temporary short circuit between the first and second discharge elements, which may be broken before operation of the fabricated electronic device. Alternatively, electrical isolation/conduction means may be provided between the first and second discharge elements, the electrical isolation/conduction means electrically isolating the first discharge element from the second discharge element after mounting peripheral circuitry and/or during ordinary operation of the electronic device, while allowing the passage of charge between the first and second discharge elements before completion of the mounting of peripheral circuitry and/or except during said ordinary operation. In this way, electrostatic discharge protection of the electronic device and suppression of leakage current of the discharge devices during the ordinary operation are accomplished if the temporary short circuit is broken and also without requiring such a breaking step. A diode ladder may be provided between the first and second discharge elements. This diode ladder will have a sufficiently high resistance that when the supply voltages are applied to the discharge elements, a low power dissipation results even if the diode ladder is left in place during operation of the device.

Besides the arrangement based on the diode ladder, there is alternatively an arrangement that the electrical isolation/conduction means comprise a switching element which is turned off and provides a high impedance between the first and second discharge elements after mounting peripheral circuitry and/or during ordinary operation of the electronic device, while being turned on and allowing conduction between the first and second discharge elements before completion of the mounting of peripheral circuitry and/or except during said ordinary operation. In a further developed form, the switching element may be constituted by a transistor comprising: two input/output electrodes connected to the first and second discharge elements, respectively; and a control electrode, and the electrical isolation/conduction means further comprises: a resistance element coupling the control electrode with one of the input/output electrodes or the second discharge element; and a circuit section arranged to apply the control electrode with a voltage for turning on the transistor via the resistance element on the basis of a voltage occurring between the first and second discharge elements before completion of mounting peripheral circuitry and/or except ordinary operation of the electronic device, and on the other hand, to apply the control electrode with a voltage for turning off the transistor after mounting peripheral circuitry and/or during said ordinary operation. In this way, the isolation/conduction means can be implemented in a relatively simple circuit composition. As a further simple configuration, the circuit section may comprise a coupling portion for short-circuiting between the control electrode and the other of the input/output electrodes or the first discharge element during said ordinary operation.

Also in order to achieve the objects, another aspect of the invention is an electronic device comprising: an array of pixels provided on a substrate and arranged in rows and columns, each pixel comprising a switching element; and a plurality of row and column address lines for addressing each pixel, wherein each row and column address line is connected to a first discharge element through a first discharge device and to a second discharge element through a second discharge device, wherein the first discharge device allows the passage of charge between the address line and the first discharge element when the address line is at a potential below that of the first discharge element, and the second discharge device allows the passage of charge between the address line and the second discharge element when the address line is at a potential above that of the second discharge element, wherein at least one of the first and second discharge elements has a conductive path making conduction in order that leakage current of the discharge device occurring during ordinary operation of the electronic device can be used for peripheral circuitry of the pixel array.

In this way, since the leakage current caused in the discharge devices can be effectively used, it is possible to contribute to seduction of the power consumption during the ordinary operation of the electronic device. Although this constitution requires a conductive path for applying a supply voltage to the discharge element, the conductive path can merely be for applying a relatively low voltage, so that a problem of electrical corrosion as mentioned above is mitigated.

For one actual example in this aspect, the conductive path may connect the second discharge element and a power supply line for a driver circuit for applying signals to the column address lines. If a potential on the row address line is greater than a supply voltage for the drive circuit for providing the column address lines with signals during the ordinary operation, the second discharge device is applied with a forward directional voltage to have a possibility of bringing about leakage current. It can be implemented to use the leakage current for the power source of the drive circuit, namely driving energy through the conductive path.

In the above-mentioned aspects, at least one conductive line other than the row and column address lines is also connected to the first or second discharge element through the first discharge device, of course. The conductive line may be an auxiliary line such as a so-called storage capacitor connection line, a common electrode connection line, as used in a liquid crystal display device or the like.

The device of the invention may typically comprise a liquid crystal display.

Although particularly useful in pixellated devices whose pixels include TFTs, the invention is applicable also to array devices using alternative kinds of switching elements such as two terminal non-linear devices, for example thin film diode elements.

DESCRIPTION OF THE PREFERRED EMBODIMENT(S)

The above-mentioned aspects and other forms of the invention will now be described in more detail on the basis of embodiments with reference to the accompanying drawings.

The Figures are merely schematic and are not drawn to scale. The same reference numbers are used throughout the Figures to denote the same or similar parts.

Figure 1:
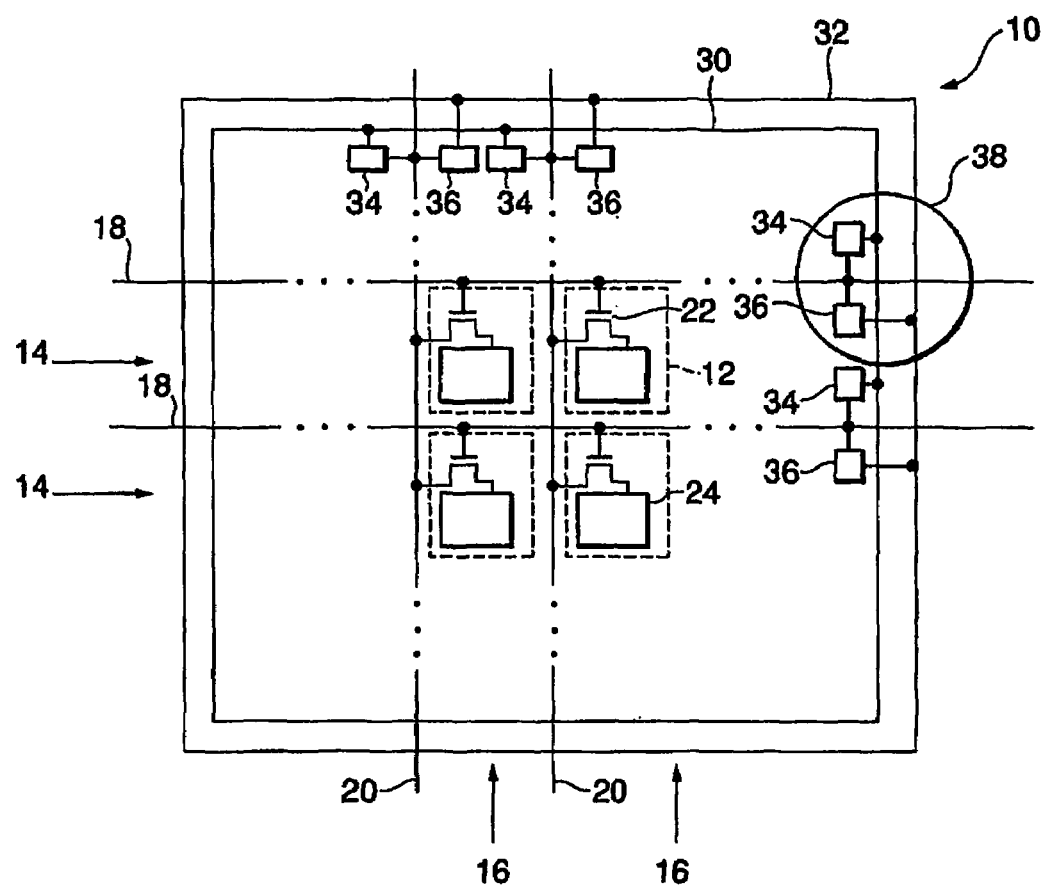
FIG. 1 shows a main structure of a pixel array of an electronic device according to an embodiment of the invention.

FIG. 1 shows an electronic device 10 comprising an array of pixels 12 arranged in rows 14 and columns 16. Each row 14 of pixels shares a common row conductor 18, and each column 16 of pixels shares a common column conductor 20. Each pixel 12 is thus associated with a unique combination of row and column conductors 18, 20, enabling individual pixels to be addressed.

As shown schematically in FIG. 1, each pixel 12 comprises a drive transistor 22 and a pixel electrode 24. The gate of the drive transistor 22 of each pixel is connected to the associated row conductor 18. In this way, signals provided to the row conductors 18 enable the pixel transistors 22 to be turned on or off. When a drive transistor 22 is turned on, it allows the passage of current between the column conductor 20 and the pixel electrode 24.

The structure described above is conventional, and various types of electronic device may include this structure. For example, the electronic device may comprise an active matrix liquid crystal display device, in which case, the pixel electrode 24 is used to modulate the corresponding portion of a liquid crystal material layer, or other active matrix display device such as an electrophoretic display device or active matrix LED display device in which the transistor is used to control current through an LED display element. Alternatively, the electronic device may comprise a sensing array device such as a radiation imaging device, in which case the pixel electrodes 24 may comprise a light receiving electrode of a photodiode, or other light-sensitive component. In each case of application, each pixel may comprise additional components, such as capacitors, and the representation in FIG. 1 is purely schematic.

This invention is concerned with all types of device in which arrays of active switching elements such as transistors, particularly thin film transistors, are fabricated on a common substrate. It is for this reason that each pixel 12 is simply represented as a transistor 22 and a pixel electrode 24, although it should be appreciated that other kinds of switching elements could be used.

As described above, a problem arises in the fabrication of this type of array device when electrostatic charges are allowed to build up on the row and column conductors 18, 20, as these charges can result in damage to the layers forming the drive transistors 22.

In accordance with the invention, each row and column conductor 18, 20 is coupled to a pair of discharge elements 30, 32 in the form of conductive lines extending around the periphery of the pixel array. Each row and column conductor 18, 20 is coupled to the first discharge line 30 through a first discharge device 34 and is coupled to the second discharge line 32 through a second discharge device 36.

Each discharge device 34, 36 provides diode-like characteristics, namely allowing the passage of charge when a voltage between the row or column conductor 18, 20 and the associated discharge line 30, 32 exceeds a turn-on threshold.

Figure 2:
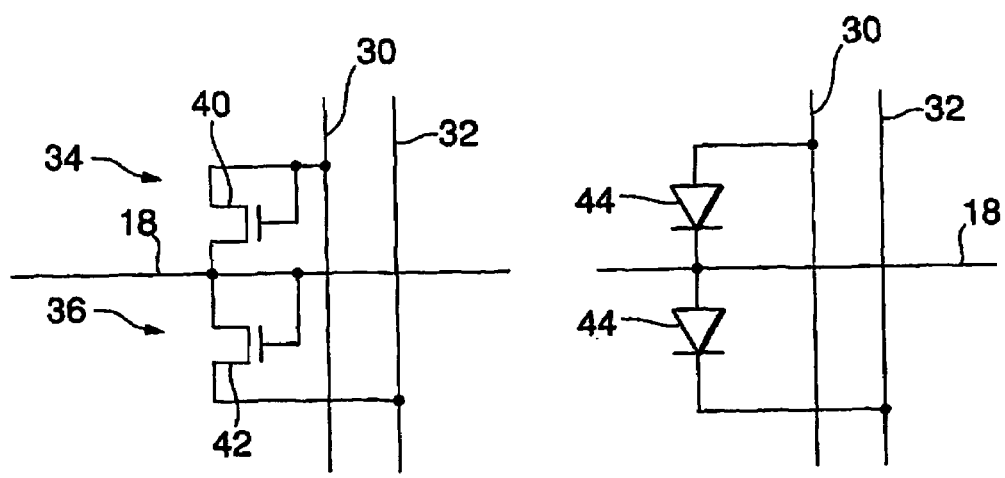
FIG. 2 shows one example of the first and second discharge devices associated with each row and column conductor in the electronic device of FIG. 1 and its equivalent circuit.

FIG. 2 shows in greater detail the area 38 in which a connection portion of an arbitrary pair of discharge elements is circled in FIG. 1. The other pairs of discharge elements are likewise associated with the row and column conductors, respectively.

As shown, on the left side in FIG. 2 the first discharge device 34 comprises a thin film transistor 40, formed using the same transistor-forming processing steps as required for the pixel transistors 22. The drain of the transistor 40 is connected to the first discharge line 30 and the source is connected to the row conductor 18. The drain is coupled to the gate, to provide diode-like operating characteristics. In other words, if the voltage on the drain is a sufficient level above the voltage on the source, the transistor 40 will conduct. In this way, the first discharge device 34 conducts when the row conductor 18 is at a potential sufficiently below the potential of the first discharge line 30, namely lower by at least the turn-on voltage of the diode-connected transistor.

The second discharge device 36 also comprises a transistor 42 with the gate and drain coupled at the row conductor 18 together and is formed by the transistor forming processing steps mentioned above. The second transistor 42 conducts when the row conductor 18 is at a potential sufficiently above the potential of the second discharge line 32. The right side in FIG. 2 shows the equivalent circuit of the discharge element connection portion, representing the diode-connected transistors as diodes 44.

If there is a build-up of electrostatic charges on any individual row or column conductor 18, 20, this will cause the potential on the conductor to change (with respect to the potential of the other row and column conductors) so that one of the discharge devices 34, 36 will conduct, to dissipate the excess charges to one of the discharge lines 30, 32. If just a floating state is held between the discharge lines 30, 32, the voltages on the row and column conductors 18, 20 will have differences from each other. To avoid this situation, some form of coupling is desired between the discharge lines 30, 32.

One possibility is to electrically connect the two discharge lines 30, 32. This provides the equivalent circuit shown in FIG. 3.

Figure 3:
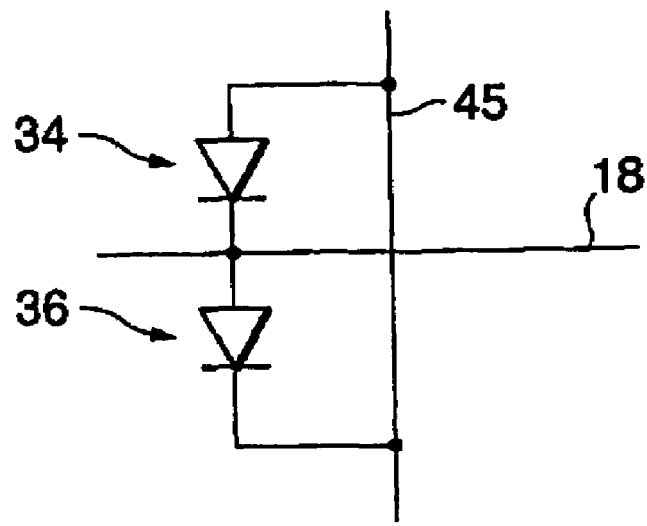
FIG. 3 shows an equivalent circuit of FIG. 2 when the discharge elements are connected together.

In this case, variations in the voltage on the row conductor 18 can not simply affect the shared discharge line 45. The discharge devices 34, 36 are associated with the other row and column conductors and these conduct electricity, so that the shared discharge line 45 will always remain at a voltage near the average voltage on all of the row and column conductors 18, 20. However, the use or remain of a single discharge line 45 as shown in FIG. 3 results in high power consumption when the electronic device is in ordinary working. During the working, the voltages on the row conductors 18 will vary between the maximum and minimum gate voltages of the drive transistors 22, and the voltages on the column conductors 20 will vary between the maximum and minimum source voltages of the drive transistors 22. As a result, normal operation of the pixels will result in some current flow in the discharge devices, resulting in wasted power consumption.

The invention enables ESD damage protection to be provided during fabrication of the array, but also enables the power consumption of the protection circuits to be reduced significantly during use of the electronic device. To this end, the discharge lines 30, 32 are respectively made in an electrically floating state instead of making application of a predetermined fixed voltage to the discharge lines 30, 32. This means that the discharge lines 30, 32 are provided with voltages only by the row and column conductor 18, 20 but not provided with voltages by other voltage-application means, namely that they are not given any potential by anything except signals from the row and column conductors 18, 20. To specifically realize this, as shown in FIG. 1, the discharge lines 30, 32 are just extended surrounding the pixel array (taking a ring-form, in this example) so as not to be connected anywhere except for being coupled to the row and column conductors 18, 20 through the discharge devices 34, 36.

The present inventors have found that, during operation of the electronic device, power consumption of the discharge devices 34, 36 can be more reduced by making the discharge line 30, 32 be floating than by applying the discharge lines 30, 32 with predetermined fixed voltages for biasing them in a reversed direction (or forming a state close thereto) so that the discharge devices 34, 36 do not conduct electricity. Furthermore, it has been found that the floating arrangement does not require any conductive lead lines for coupling some other supply line to the discharge lines 30, 32 as means for supplying a voltage to the discharge line 30, 32, so that electrical corrosion of the lead line as previously mentioned can be prevented preferably. It is noted that the way of applying a predetermined fixed voltage to the discharge lines 30, 32 mentioned here is described in a specification of a Great Britain Patent Application No. 0119299.6, which anticipates this application.

Besides, such elimination of the lead line offers an advantage that wiring layout of the discharge lines 30, 32 and more is more facilitated. In addition, since average voltages appearing on the discharge lines 30, 32 are expected to be at low values during ordinary operation of the electronic device, an advantage can be expected which extreme degradation in quality of displayed images due to a so-called line-defect can be suppressed even if the discharge device 34, 36 is broken for some reason and the discharge line 30, 32 is short-circuited with respect to the row or column conductor 18, 20.

Moreover, this example offers an advantage that patterns of the discharge lines can be formed simply, efficiently and effectively by making the discharge lines in ring-form of continuous leading conductive path entirely surrounding the pixel array.

As mentioned above, it is desirable for the discharge lines 30, 32 to be connected together to improve the ESD protection during fabrication of the array, but this connection should not be maintained when the electronic device is to be used.

Figure 4:
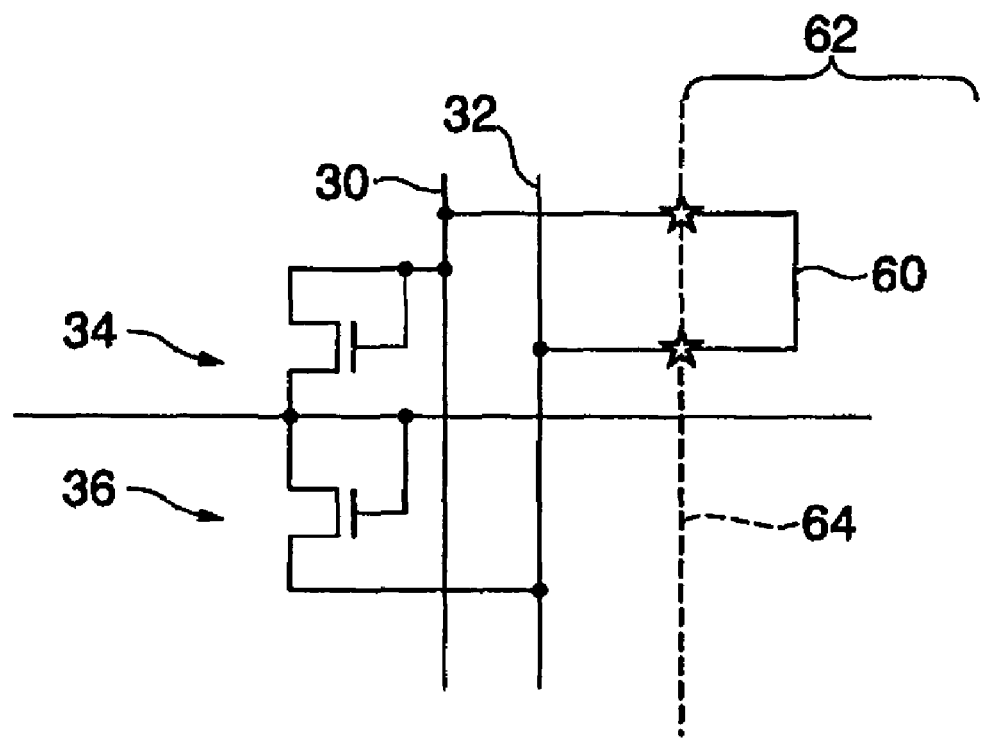
FIG. 4 shows a first arrangement (temporary short circuit) in which the first and second discharge elements.

As shown in FIG. 4, a temporary short circuit 60 may be provided between the discharge lines 30, 32, arranged as a track coupling the two discharge lines together. This track may extend to an area 62 of the substrate which is to be removed after fabrication, along dotted line 64 shown in FIG. 4. In this way, a short circuit is provided during fabrication of the array of transistors, but this short circuit is broken before the electronic device is to be operated.

Figure 5:
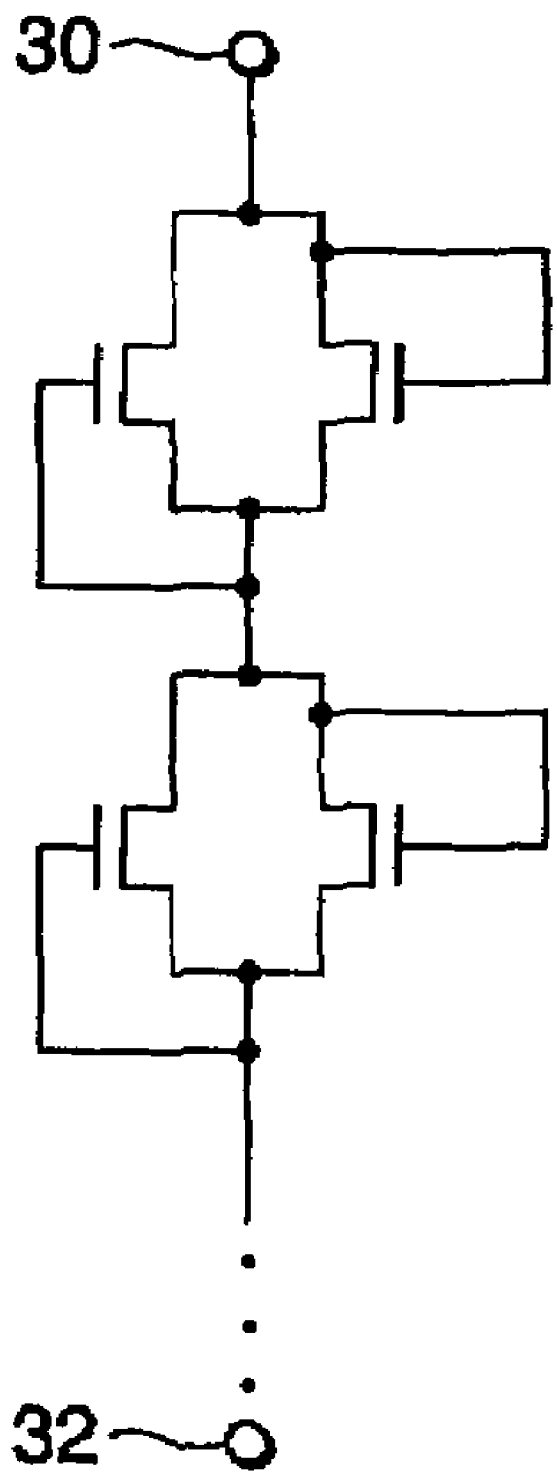
FIG. 5 shows a first arrangement for coupling the first and second discharge elements.

In order to avoid the need to physically remove portions of the substrate, the two discharge lines 30, 32 may be connected together using a diode-connected TFT ladder (ladder-type diode-connected TFTs), as shown in FIG. 5. This can be arranged to provide minimal current flow through it during operation, so that it does not need to be removed. To minimise the current flow through the ladder, the width to length ratio of each transistor, and the number of devices in series are chosen for a specific set of discharge lines.

The diode ladder serves as electrical isolation/conduction means. It will be able to conduct if a significantly high voltage due to electrostatic discharge is applied between the discharge lines during manufacturing the array while it ensures that its non-conduction based on a situation that a voltage between the discharge lines is not so highly increased during operation of the electronic device and presents a high impedance between the lines corresponding to substantially an isolated state.

One problem with the use of a temporary short circuit is that it is no longer effectively working once the short circuit has been removed. Typically, the short circuit will be removed after the fabrication process, but before connection of the peripheral circuitry to the array. Thus, although ESD protection is provided during the fabrication process, damage can still result during IC mounting (or fabricating).

Figure 6:
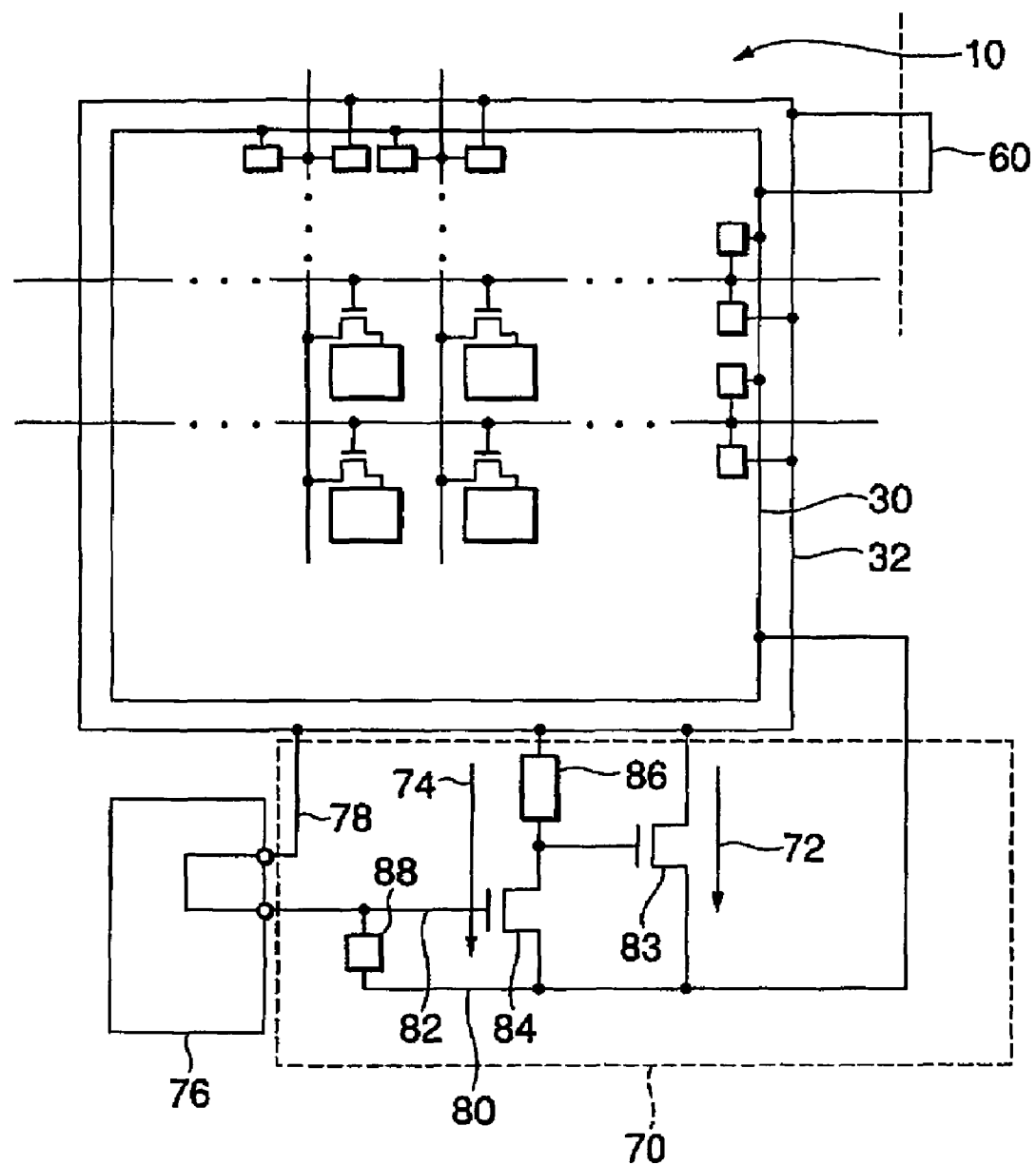
FIG. 6 shows a second arrangement for coupling the discharge elements.

FIG. 6 shows an additional protection circuit 70 (electrical isolation/conduction means) provided between the discharge lines 30, 32, and which may be fabricated integrally with the pixel array. Alternatively, it may be fabricated separately and attached to the pixel array before IC mounting (or fabricating). The protection circuit can be used to supplement a temporary short circuit 60 to provide protection during IC mounting (or fabricating) after the short circuit has been removed. Alternatively, the protection circuit may be used to provide ESD damage protection during array-fabrication as well as during IC mounting (fabricating). In this case, there is no need for removal of the protection circuit portions.

The protection circuit 70 comprises a first path 72 and a second path 74 between the first discharge line 30 and the second discharge line 32. The first path 72 comprises a transistor 83 whose source and drain electrodes are connected to the second discharge line 32 and the first discharge line 30, respectively. The second path 74 comprises a resistance element 86 whose one end is connected to the second discharge line 32 and a transistor 84 whose source and drain electrodes are connected to the other end of the resistance element 86 and the first discharge line 30, respectively. A connecting point of the resistance element 86 and the transistor 84 is connected to a gate electrode of the transistor 83 of the first path 72. The protection circuit 70 further comprises another resistance element 88 between the gate and drain electrodes of the transistor 84, the gate electrode of the transistor 84 being led out as an output of the protection circuit 70.

A block 76 figures a peripheral circuit portion of the array. It shows that the discharge line 32 and a lead line from a gate electrode of the transistor 84 are electrically coupled after assembling the peripheral circuit and/or during ordinary operation of the electronic device, but the discharge line 32 and the lead line from the transistor 84 are made electrically open before completion of assembling the peripheral circuit and/or except during the ordinary operation.

In the protection circuit of such arrangement, during the fabrication of the array and during mounting the peripheral ICs (in non-connection of the lead line), the transistor 84 keeps in off-state, and if electrostatic charges bring about a sufficiently high voltage on the discharge line 32 as against the discharge line 30 (or a sufficiently low voltage on the discharge line 30 as against the discharge line 32, the transistor 83 is turned on and the resistance element 86 and the transistor 83 effectively acts as a diode-connected transistor to make coupling between the discharge lines 30 and 32. In this way the electrostatic discharge damage protection is achieved.

On the other hand, when the electronic device is working after the mounting of the peripheral ICs (in connection of the lead line), the transistor 84 is constantly turned on by voltages on the discharge lines 30, 32, appearing at that time, and accordingly the transistor 83 is made off so that the first path 72 is cut off. In this case, the resistance element 86 is supposed to have a sufficiently high impedance, so that there is only little current flow in the second path 74, which can be neglected, and thereby the discharge line 30 and the discharge line 32 are made practically to be electrically isolated.

It should be noted that another resistance element 88 is optional and plays a subsidiary part for ensuring that the transistor 84 is properly turned off.

All of the components in the protection circuit 70 may be implemented using thin film transistors. In particular, the resistive elements 86, 88 may be formed as single or multiple diode-connected transistors, which provide a definable resistance in the reverse-bias direction.

Figure 7:
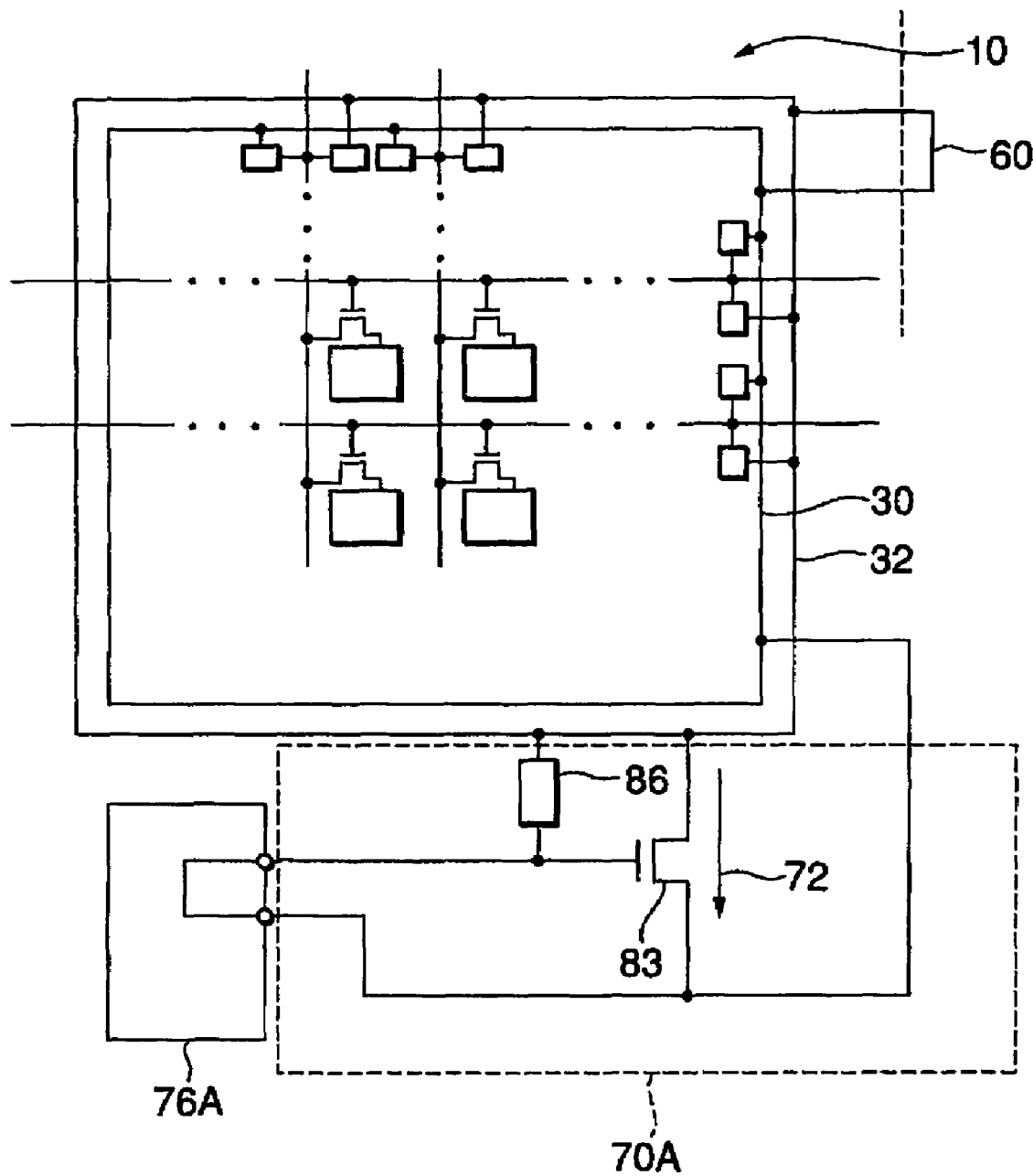
FIG. 7 shows an improved example from the third arrangement.

FIG. 7 shows an example whereby a protection circuit 70 of FIG. 6 is further simplified.

A protection circuit 70A in FIG. 7 takes a form of omitting the transistor 84 and resistance element 88 in FIG. 6, wherein the gate electrode of the transistor 83 and the drain electrode of the transistor 83 are led out to a peripheral circuit portion 76 outside the protection circuit 70A.

Likewise also in this case, during non-connection of the lead line, if electrostatic charges bring about a sufficiently high voltage on the discharge line 32 as against the discharge line 30 (or a sufficiently low voltage on the discharge line 30 as against the discharge line 32, the resistance element 86 and the transistor 83 effectively acts as a diode-connected transistor to make coupling between the discharge lines 30 and 32. In this way the electrostatic discharge damage protection is achieved.

On the other hand, when the electronic device is working after the mounting of the peripheral ICs (in connection of the lead line), voltages on the discharge lines 30, 32, appearing at that time cause the transistor 83 to be off so that the path 72 is cut off. In this case, the resistance element 86 is supposed to have a sufficiently high impedance, so that there is only little current flow in the path including the resistance element 86 and the lead line, which can be neglected, and thereby the discharge line 30 and the discharge line 32 are made practically to be electrically isolated.

Figure 8:
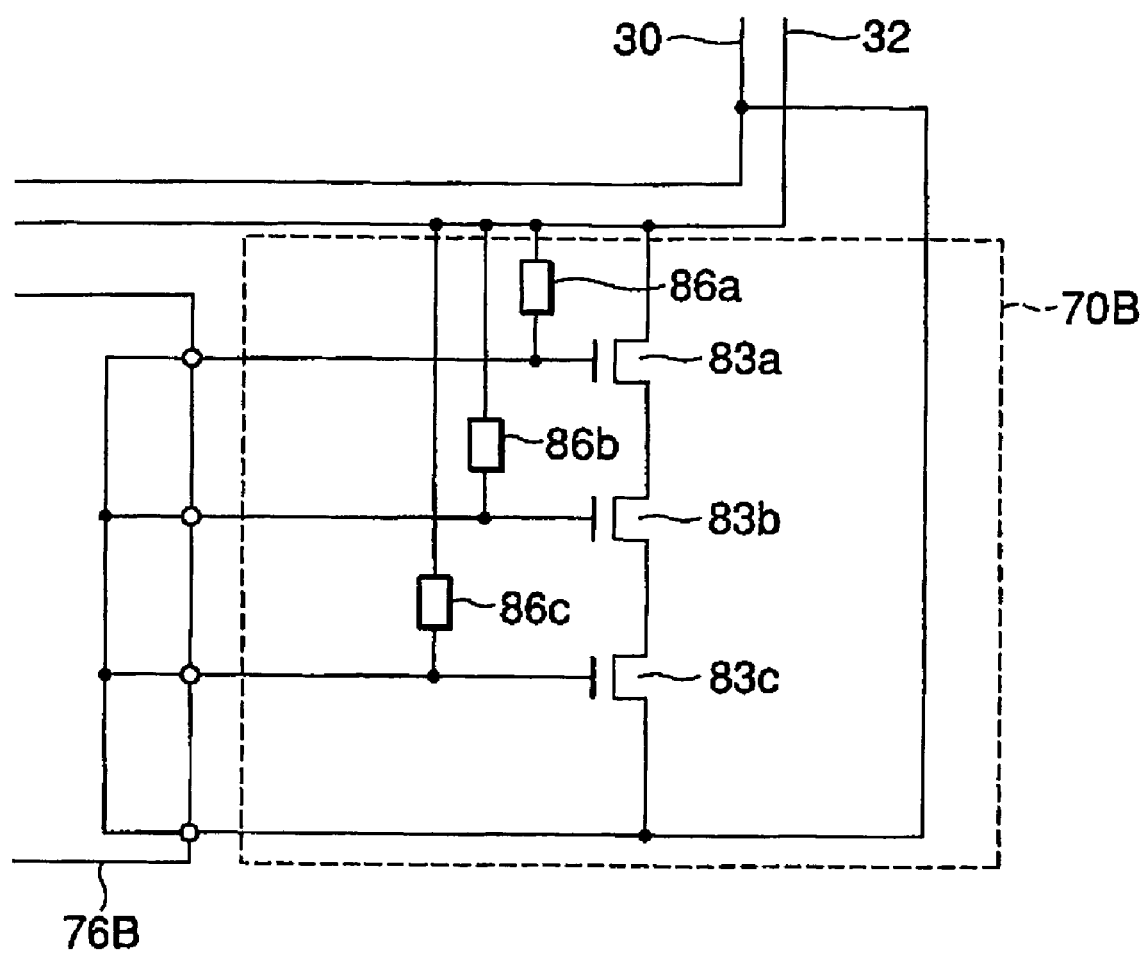
FIG. 8 shows a further improved example from the third arrangement.
Figure 9:
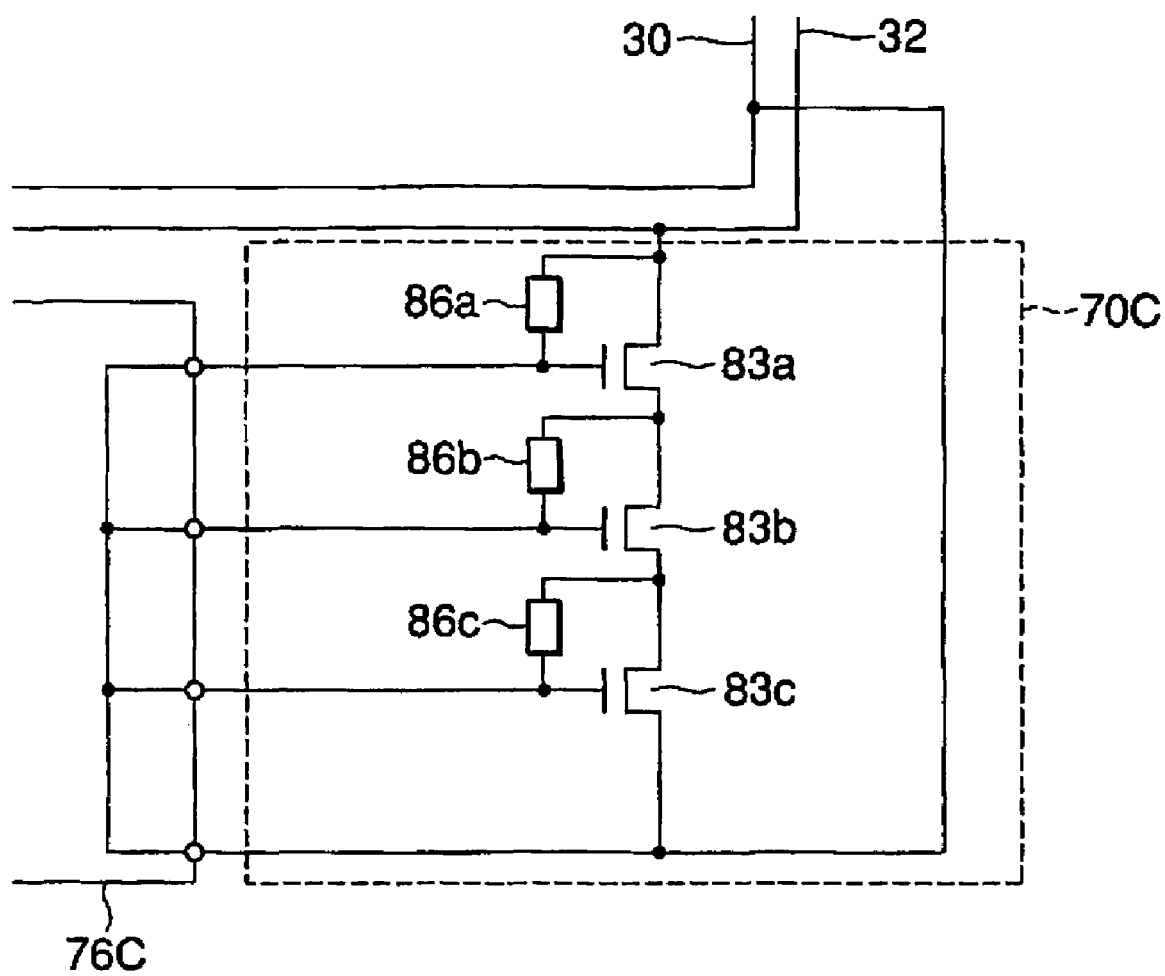
FIG. 9 shows yet another improved example from the third arrangement.

FIGS. 8 and 9 show examples in which the arrangement shown in FIG. 7 is made more reliable.

A protection circuit 70B in FIG. 8 comprises a plurality of cascade-connected transistors 83a, 83b, 83c provided between the discharge line 30 and the discharge line 32 and the respective resistance elements 86a, 86b, 86c connected between the gate electrodes of the transistors and the discharge line 32, the gate electrodes being led out to a peripheral circuitry portion 76B and taking the form of being interconnected during ordinary operation of the electronic device.

A protection circuit 70C in FIG. 9 comprises a plurality of cascade-connected transistors 83a, 83b, 83c provided between the discharge lines 30 and 32, and resistance elements 86a, 86b, 86c connected between gate electrodes and source electrodes of the respective transistors, the gate electrodes being led out to a peripheral circuitry portion 76C and taking the form of being interconnected during ordinary operation of the electronic device.

According to these arrangements, even if any one transistor is defective for some cause, the other transistors and the associated circuitry paths can lead to the electrostatic discharge damage protection in fabrication of the array and in forming the peripheral circuitry and electrical isolation of the discharge lines 30, 32 during ordinary operation of the electronic device. Therefore, a high reliability of form is provided.

In the above embodiments, only constitution has been mentioned, in which a discharge line is made floating during ordinary operation of the electronic device by a way of having no means for applying any voltages to the discharge line (except means of signals from the discharge devices) as in FIG. 1. However, instead of realization of the floating of a discharge line by having no such means, it is possible, for example, that the discharge line is coupled with a power supply line via a sufficiently high-resistance element or is coupled with a ground potential via an appropriate capacitance element so as for the discharge line to be substantially in floating. Alternatively, the following different scheme can also obtain inherent advantages.

Figure 10:
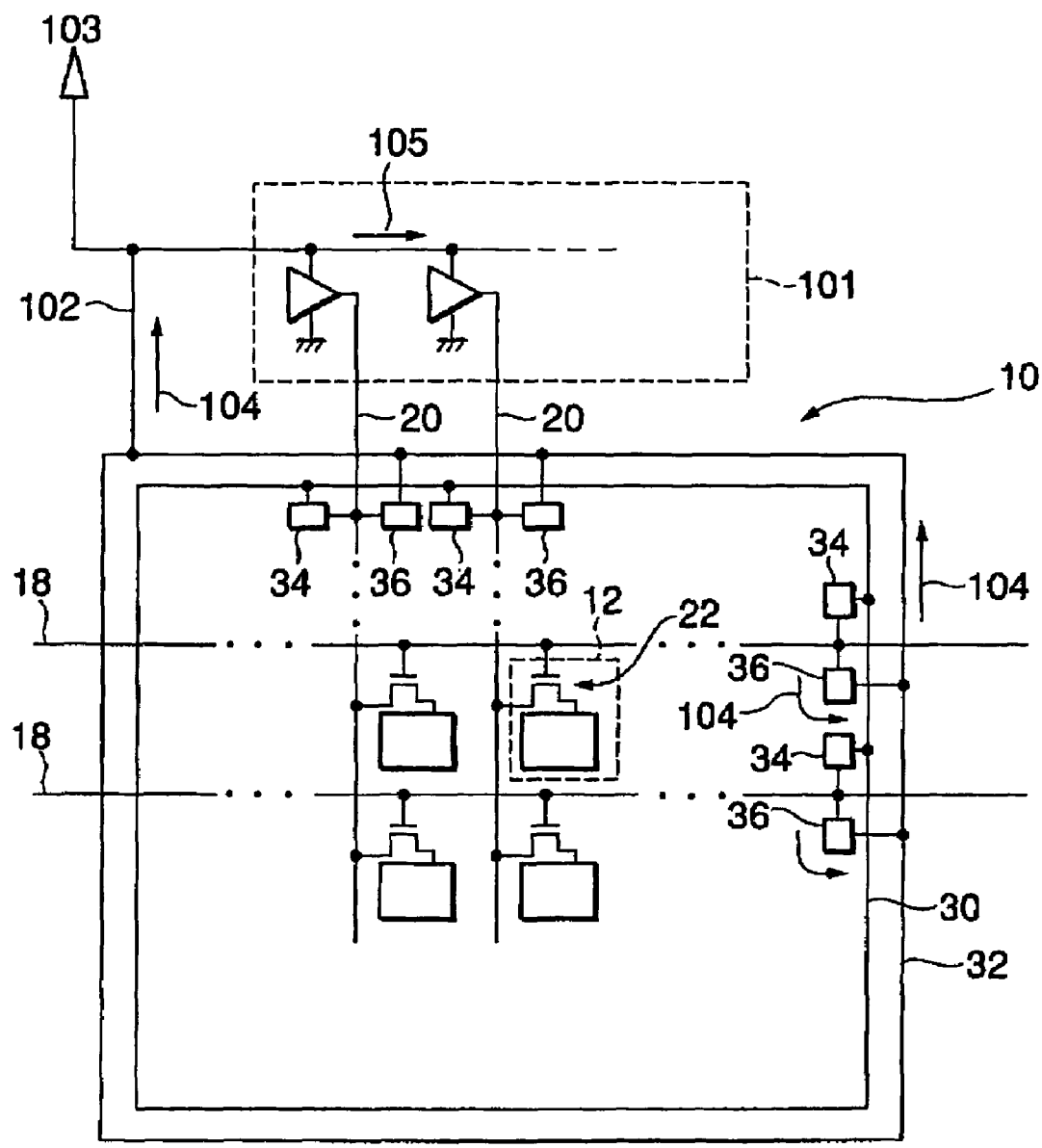
FIG. 10 shows a main structure of a pixel array of an electronic device according to another embodiment of the invention.

FIG. 10 shows yet another embodiment, in which the equivalent parts to ones shown in FIG. 1 are given the same reference numbers.

There is provided an additional conductive line 102 connecting the discharge line 32 to a power supply line of a source driver 101. The source driver 101 is, as well-known, provided with output amplifiers for applying pixel signals to the respective column conductors 20, each amplifier being supplied with power from a power source 103 through its supply power line.

A voltage of the power source 103 usually has a lower value than the maximum voltage value of a gate control signal of a pixel driving transistor which is applied to the row conductor 18. For example, the power source voltage is on the order of 5V, whereas the gate control signal is between −10 and +15 Volts. When the gate control signal has a higher value than the power source voltage, the second discharge device 36 is applied with a voltage in the forward direction, so that leakage current 104 will flow through the second discharge line 32 and additional conductive line 102 into the power supply line. The source driven 101 can thus reuse the current having flowed into this power supply line.

It is noted that it has basically be considered that the discharge line 32 should be applied with a voltage of a high value equal to or higher than a value of the maximum voltage applied to the row conductor 18 so as to always reverse-bias the discharge device 36 in order to prevent the leakage current from flowing through the discharge device 36 and the wasted power consumption from occurring. Contrarily, this embodiment is directed to intentionally couple a voltage of the middle value within a range of voltages applied to the row conductor 18 with the discharge line 32 instead of the reverse-biasing. In this way, just the power supply voltage for the source driver 105 can be used as is, and the leakage current 104 having flowed through the discharge device 36 can successfully be allowed to be recycled for the power supply line of the source driver 105. In other words, it is ensured that the discharge device 36 is not allowed to conduct when the row conductor 18 is applied with a voltage no higher than the middle value, while the conducted current of the discharge device 36 is put to practical use for operation of the source driver 105 by a way of being able to make the recycling when the row conductor 18 is applied with a voltage higher than the middle value.

There are further advantages resulting from the coupling of the middle value voltage to the discharge line. That is, as in the Great Britain Patent Application, if the discharge line is applied with a voltage so high enough to reverse-bias the discharge device 36 all the times, the conductive line for the power-supplying of the high voltage can easily have electrical corrosion. However, if the conductive line couples the discharge line to the middle value voltage that is lower than the said high voltage, it has been found that the conductive line is hard to have such electrical corrosion. Thus, even in this embodiment, it is possible to make measures against the electrical corrosion as performed in the previous embodiments.

Also in this embodiment, voltages on the discharge lines 30, 32 are low during ordinary operation of the electronic device, and thereby suppression effect of extreme degradation of display image quality due to the line-defect as described above can be expected likewise.

Figure 11:
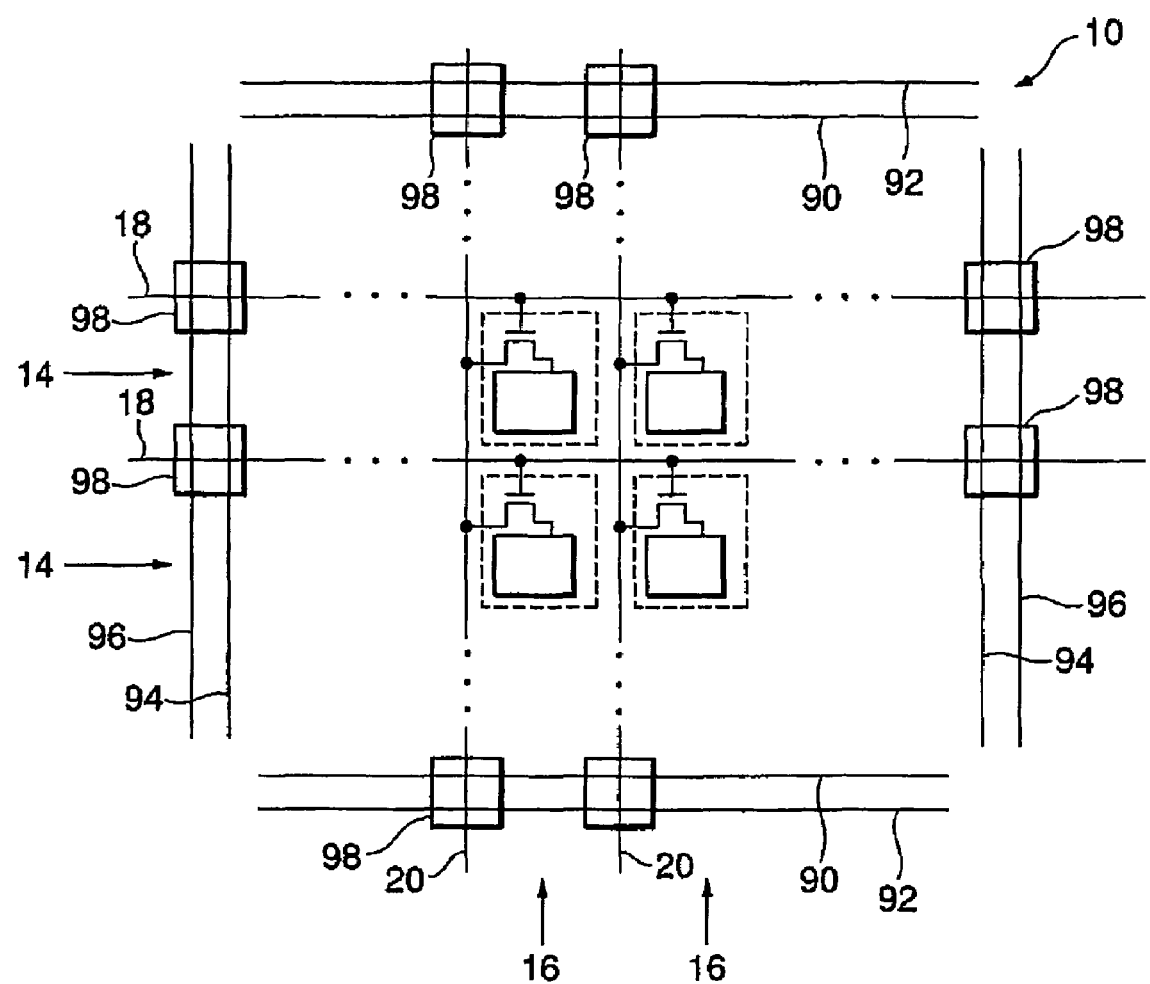
FIG. 11 shows a modification of the embodiments of the invention.

In the description above, the discharge lines 30, 32 have been shown as shared between all row and column conductors. Instead, separate row and column discharge bars may be provided. FIG. 11 shows a device 10 in which separate row discharge lines 90, 92 and column discharge lines 94, 96 are provided. The discharge devices have been represented schematically as circuitry 98 which operates in exactly the same manner as described above. However, the use of separate row and column discharge lines enables the discharge circuitry to be appropriately designed for the specific voltages expected on the row and column lines during normal operation of the device. For example, the row driver of a liquid crystal display typically provides voltage levels between around +20V and −20V on the row conductors, in order to provide the required turn on and turn off characteristics for the pixel transistor. The column driver, however, typically provides voltages on the column conductors with a voltage swing of only around 5V.

In the example shown in FIG. 11, discharge circuitry 98 is provided at each end of each of the row and column conductors. This minimises the path length between individual pixel circuits and the nearest discharge circuit, and it is preferably possible that electrostatic charges built-up on either end of the conductors can immediately be passed through the discharge circuit.

The pair of discharge lines 94, 96 at one end of the rows may or may not be connected to the pair of discharge lines 94, 96 at the opposite end of the rows, and similarly the pair of discharge lines 90, 92 at one end of the columns may or may not be connected to the pair of discharge lines at the opposite end of the columns.

In the embodiments described above, the discharge devices have been represented as a single diode-connected transistor, but of course, multiple diode-connected transistors may be used to form each discharge device 34, 36. Alternatively, other types of unidirectionally conductive devices may be used.

Although it has been mentioned above that the discharge devices 34, 36 are coupled with the row and column conductors 18, 20 that are address lines, discharge devices are desirable likewise to be coupled to conductive lines other than these address lines, e.g. storage capacitor-connection lines and/or common electrode-connection lines used in a liquid crystal display device, which need electrostatic discharge protection. The reason of it is that such conductive lines are also formed on the array substrate commonly carrying the address lines and have possibility of occurring the electrostatic discharge damage likewise.

The specific examples of a radiation sensor and a liquid crystal display have been mentioned above. No detailed description is given of the precise pixel layout of each of these types of device, as this will be well known to those skilled in the art. The invention can be used to prevent damage during fabrication of any array device.

Various modifications will be apparent to those skilled in the art.

EXPLANATION OF SYMBOLS

10 . . . electronic device
12 . . . pixel
14 . . . row
16 . . . column
18 . . . row conductor
20 . . . column conductor
22 . . . thin film transistor
24 . . . pixel electrode
30 . . . first discharge element
32 . . . second discharge element
34 . . . first discharge device
36 . . . second discharge device
40 . . . first transistor
42 . . . second transistor
44 . . . equivalent diode
45 . . . shared connection line
60 . . . temporary short circuit
70, 70A, 70B, 70C . . . protection circuit
72 . . . first path
74 . . . second path
76, 76A, 76B, 76C . . . peripheral circuit portion 78, 80 . . . leading-out line of a discharge element
82 . . . gate control signal line
83, 83a, 83b, 86c, 84 . . . transistor
86, 86a, 86b, 86c, 88 . . . resistance element
101 . . . source driver
102 . . . conductive path for connection of a supply line
103 . . . power supply
104 . . . leakage current

The invention claimed is:

1. An electronic device comprising:
an array of pixels provided on a substrate and arranged in rows and columns, each pixel comprising a switch element; and
a plurality of row and column address lines for addressing each pixel,
wherein:
each row and column address line is connected to a first discharge element through a first discharge device and to a second discharge element through a second discharge device, and electrical isolation/conduction means are provided between the first and second discharge elements,
the first discharge device provides a unidirectional current path that allows the passage of charge between the address line and the first discharge element when the address line is at a potential below that of the first discharge element, and the second discharge device provides a unidirectional current path that allows the passage of charge between the address line and the second discharge element when the address line is at a potential above that of the second discharge element,
the electrical isolation/conduction means electrically isolating the first discharge element from the second discharge element after mounting peripheral circuitry and/or during ordinary operation of the electronic device, while allowing the passage of charge between the first and second discharge elements before completion of the mounting of peripheral circuitry and/or except during said ordinary operation, and
at least one of the first and second discharge elements has a configuration in which the one is in a substantially electrically floating state during ordinary operation of the electronic device.

2. The device of claim 1, wherein the electrical isolation/conduction means comprise a switching element that is turned off and provides a high impedance between the first and second discharge elements after mounting peripheral circuitry and/or during ordinary operation of the electronic device, while being turned on and allowing conduction between the first and second discharge elements before completion of the mounting of peripheral circuitry and/or except during said ordinary operation.

3. The device of claim 2, wherein the switching element is constituted by a transistor comprising: two input/output electrodes connected to the first and second discharge elements, respectively; and a control electrode, and the electrical isolation/conduction means further comprises: a resistance element coupling the control electrode with one of the input/out electrodes or the second discharge element; and a circuit section arranged to apply the control electrode with a voltage for turning on the transistor via the resistance element on the basis of a voltage occurring between the first and second discharge elements before completion of mounting peripheral circuitry and/or except ordinary operation of the electronic device, and on the other hand, to apply the control electrode with a voltage for turning off the transistor after mounting peripheral circuitry and/or during said ordinary operation.

4. The device of claim 3, wherein the circuit section includes a coupling portion for short-circuiting between the control electrode and the first or the second discharge element during said ordinary operation.

5. An electronic device comprising:
an array of pixels provided on a substrate and arranged in rows and columns, each pixel comprising a switch element; and
a plurality of row and column address lines for addressing each pixel,
wherein:
each row and column address line is connected to a first discharge element through a first discharge device and to a second discharge element through a second discharge device,
the first discharge device provides a unidirectional current path that allows the passage of charge between the address line and the first discharge element when the address line is at a potential below that of the first discharge element, and the second discharge device provides a unidirectional current path that allows the passage of charge between the address line and the second discharge element when the address line is at a potential above that of the second discharge element,
the first and second discharge elements are initially short-circuited, and the connection between the first and second discharge elements is broken down before the operation of the electronic device, and
at least one of the first and second discharge elements has a configuration in which the one is in a substantially electrically floating state during ordinary operation of the electronic device.

6. The device of claim 5, wherein the first discharge element includes one or more conductive tracks to which the row and column address lines are connected through their respective first discharge devices, the conductive tracks being arranged in the vicinity of the periphery of the pixel array.

7. The device of claim 5, wherein the second discharge element includes one or more conductive tracks to which the row and column address lines are connected through their respective second discharge devices, the conductive tracks being arranged in the vicinity of the periphery of the pixel array.

8. The device of claim 6, wherein the conductive track is extended surrounding the periphery of the pixel array.

9. The device of claim 5, wherein each discharge device includes at least one unidirectionally conductive element.

10. An electronic device comprising:
an array of pixels provided on a substrate and arranged in rows and columns, each pixel comprising a switching element; and
a plurality of row and column address lines for addressing each pixel,
wherein
each row and column address line is connected to a first discharge element through a first discharge device and to a second discharge element through a second discharge device,
wherein the first discharge device allows the passage of charge between the address line and the first discharge element when the address line is at a potential below that of the first discharge element, and the second discharge device allows the passage of charge between the address line and the second discharge element when the address line is at a potential above that of the second discharge element, wherein at least one of the first and second discharge elements has a conductive path making conduction in order that leakage current of the discharge device occurring during ordinary operation of the electronic device can be used for peripheral circuitry of the pixel array.

11. The device of claim 10, wherein the conductive path connects the second discharge element and a power supply line for a driver circuit for applying signals to the column address lines.

12. The device of claim 5, wherein at least one conductive line other than the row and column address lines is also connected to the first or second discharge element through the first discharge device.

13. The device of claim 5, wherein at least one of the first and second discharge elements is coupled to a power supply line for a driver circuit of the pixel array in order that leakage current of the discharge device occurring during operation of the electronic device can be used for peripheral circuitry of the pixel array.

14. The device of claim 6, wherein each of the first and second discharge element includes one or more conductive tracks to which the row and column address lines are connected through their respective first and second discharge devices, the conductive tracks being arranged in the vicinity of the periphery of the pixel array.

15. The device of claim 14, wherein the conductive tracks are extended surrounding the periphery of the pixel array.

16. The device of claim 10, wherein the second discharge element includes one or more conductive tracks to which the row and column address lines are connected through their respective second discharge devices, the conductive tracks being arranged in the vicinity of the periphery of the pixel array.

17. The device of claim 10, wherein the first and second discharge devices each provides a unidirectional current path.

18. The device of claim 10, wherein the conductive path is connected to a power supply line for a driver circuit of the pixel array.

* * * * *